US006999084B2

United States Patent
Mochizuki et al.

(10) Patent No.: US 6,999,084 B2
(45) Date of Patent: Feb. 14, 2006

(54) METHOD AND APPARATUS FOR COMPUTER GRAPHICS ANIMATION UTILIZING ELEMENT GROUPS WITH ASSOCIATED MOTIONS

(75) Inventors: Yoshiyuki Mochizuki, Suita (JP); Katsunori Orimoto, Neyagawa (JP); Toshiki Hijiri, Hirakata (JP); Akira Uesaki, Takatsuki (JP); Shigeo Asahara, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 354 days.

(21) Appl. No.: 10/379,552

(22) Filed: Mar. 6, 2003

(65) Prior Publication Data

US 2003/0179204 A1   Sep. 25, 2003

(30) Foreign Application Priority Data

Mar. 13, 2002   (JP)   .............................. 2002-068099

(51) Int. Cl.
*G06T 13/00*   (2006.01)
*G06T 15/70*   (2006.01)

(52) U.S. Cl. ..................................... 345/473; 345/474
(58) Field of Classification Search ................ 345/473, 345/474, 475, 950, 951
See application file for complete search history.

(56) References Cited

U.S. PATENT DOCUMENTS

| | | | | |
|---|---|---|---|---|
| 6,320,988 | B1 * | 11/2001 | Yamaguchi et al. | 382/276 |
| 6,331,861 | B1 * | 12/2001 | Gever et al. | 345/473 |
| 6,414,684 | B1 * | 7/2002 | Mochizuki et al. | 345/473 |
| 6,503,144 | B1 * | 1/2003 | Rimoto et al. | 463/4 |
| 6,512,520 | B1 * | 1/2003 | Naka et al. | 345/473 |
| 6,532,015 | B1 * | 3/2003 | Hayashi | 345/474 |
| 2002/0167521 | A1 | 11/2002 | Sasaki | |

OTHER PUBLICATIONS

Patent Abstracts of Japan, entitled "Three-Dimensional Object Deforming Method for Video Game, Video Game Device and Computer Readable Recording Medium with Recorded Program for Video Game", vol. 2000, No. 25, Apr. 12, 2001 & JP 2001-209823 A (Square Co. Ltd.), Aug. 3, 2001.
Kraaijvanger M., entitled "The Evolution of 3D Game Models Part 1", Game Developer, Miller Freeman, San Francisco, CA, US, vol. 7, No. 10, Oct. 2000, pp. 29-33, XP001082925.
Masayuki Nakajima, entitled "3-D CG", (1994) Ohmusha, pp. 143-161.
George Maestri, entitled "Digital Character Animation", Prentice Hall. 1999 (translated by Shoichi Matsuda and Hiroshi Sasabe).

* cited by examiner

*Primary Examiner*—Ulka J. Chauhan
*Assistant Examiner*—Daniel F. Hajnik
(74) *Attorney, Agent, or Firm*—Wenderoth, Lind & Ponack, L.L.P.

(57) ABSTRACT

An animation control unit specifies shape data, hierarchical structure data, a group table, and state information. A character state calculating unit obtains the specified shape data from a shape data storing unit, the hierarchical structure data from a hierarchical structure storing unit, and the group table from a table storing unit. The character state calculating unit also obtains motion data shown in the specified state information from a motion data storing unit and specifies, from the obtained motion data, motion data identified by each group number. In accordance with the obtained hierarchical structure data, the character state calculating unit corrects the shape data by using the specified motion data. A three-dimensional rendering unit renders the corrected shape data to generate an image, and a display unit displays the generated image.

2 Claims, 13 Drawing Sheets

Fig. 9

ELEMENT GROUP TABLE 0

| GROUP ID | MOTION ELEMENT ID SET |
|---|---|
| GROUP 0 | m0, m1 |
| GROUP 1 | m2, ⋯, m7 |
| GROUP 2 | m8, m9, ⋯, m16, m17, m18, ⋯, m25, m26, m27 |
| GROUP 3 | m28, m29, m30 |
| GROUP 4 | m31, m32, m33, m34 |

ELEMENT GROUP TABLE 1

| GROUP ID | MOTION ELEMENT ID SET |
|---|---|
| GROUP 0 | m0, m1 |
| GROUP 1 | m26, m27 |
| GROUP 2 | m2, ⋯, m4, m8, m9, ⋯, m16 |
| GROUP 3 | m5, ⋯, m7, m17, m18, ⋯, m25 |
| GROUP 4 | m28, m29, m30 |
| GROUP 5 | m31, m32, m33, m34 |

ELEMENT GROUP TABLE 2

| GROUP ID | MOTION ELEMENT ID SET |
|---|---|
| GROUP 0 | m0, m1 |
| GROUP 1 | m2, ⋯, m7 |
| GROUP 2 | m8, m9, ⋯, m16, m17, m18, ⋯, m25, m26, m27 |
| GROUP 3 | m28, m29, m30 |
| GROUP 4 | m31, m32, m33, m34 |
| GROUP 5 | m35 |

Fig. 11A

EVENT P OCCURRING TIME

TABLE TRANSITION TIME FOR EVENT P

■ BASIC STATE 0

FRAME →

| ELEMENT GROUP 0 | MOTION A | MOTION C | MOTION D | MOTION C | MOTION E | ・・・ |
| ELEMENT GROUP 1 | MOTION B | MOTION D | MOTION E | MOTION D | MOTION E | MOTION A | ・・・ |
| ELEMENT GROUP 2 | MOTION C | MOTION E | MOTION A | MOTION A | MOTION C | ・・・ |
| ELEMENT GROUP 3 | EXPRESSION 0 | EXPRESSION 2 | EXPRESSION 1 | EXPRESSION 0 | MOTION B | MOTION D | MOTION E | ・・・ |
| ELEMENT GROUP 4 | EXPRESSION 0 | EXPRESSION 3 | EXPRESSION 2 | EXPRESSION 0 | EXPRESSION 2 | EXPRESSION 0 | EXPRESSION 1 | ・・・ |
| ELEMENT GROUP 5 | | EXPRESSION 3 | EXPRESSION 1 | EXPRESSION 2 | ・・・ |

GROUP TABLE 0 | GROUP TABLE 1

Fig. 11B

EVENT Q OCCURRING TIME

TABLE TRANSITION TIME FOR EVENT Q

■ BASIC STATE 0    ▨ STICK BASIC STATE

FRAME →

| ELEMENT GROUP 0 | MOTION A | MOTION C | MOTION D | MOTION C | MOTION E | ・・・ |
| ELEMENT GROUP 1 | MOTION B | MOTION D | MOTION E | MOTION D | MOTION E | MOTION A | ・・・ |
| ELEMENT GROUP 2 | MOTION C | MOTION E | MOTION A | MOTION A | MOTION C | ・・・ |
| ELEMENT GROUP 3 | EXPRESSION 0 | EXPRESSION 2 | EXPRESSION 1 | EXPRESSION 0 | EXPRESSION 3 | EXPRESSION 1 | EXPRESSION 2 | ・・・ |
| ELEMENT GROUP 4 | EXPRESSION 0 | EXPRESSION 3 | EXPRESSION 2 | EXPRESSION 0 | EXPRESSION 2 | EXPRESSION 0 | EXPRESSION 1 | ・・・ |
| ELEMENT GROUP 5 | | STICK MOTION 1 | STICK MOTION 0 | STICK MOTION 2 | ・・・ |

GROUP TABLE 0 | GROUP TABLE 2

METHOD AND APPARATUS FOR COMPUTER GRAPHICS ANIMATION UTILIZING ELEMENT GROUPS WITH ASSOCIATED MOTIONS

BACKGROUND OF THE INVENTION (1) Field of the Invention

The present invention relates to a field of three-dimensional (3D) computer graphics (CG) animation, and especially to a 3D CG animation apparatus for creating 3D graphics of a complex object having a hierarchical structure, such as a CG character.

(2) Description of Related Art

The Key Frame method is a conventional 3D graphics technology for creating animation of a character such as that modeling an animal and a human. The Key Frame method in a broad sense uses joint angle data and is based on forward kinematics and the skeleton method (see Reference Document 1* as one example). The following briefly describes this Key Frame method with reference to FIGS. 2, 3, and 4.

*Reference Document 1: San-jigen CG ("3D CD"), pp. 143–161, Masayuki Nakajima (edit.), Ohmusha, 1994.

For a character shape shown in FIG. 2, a skeletal structure shown in FIG. 3 is defined. This skeletal structure is represented by a linked hierarchical structure shown in FIG. 4.

Motion of the character's entire body is created based on direction and movement of a root in the skeletal structure shown in FIG. 3. Motions of the character's parts are created through conversion in the local coordinate system defining positions of joints in the skeletal structure. When the surface structure of the skeletal structure is moved in accordance with motion of this skeletal structure, the motion of the character is created. Conversion of joints in the local coordinate system is usually performed using a 4-by-4 matrix, so that rotation and parallel translation of joints can be represented, although joints are usually only allowed to rotate and cannot be moved in parallel. Such rotational angle of a joint is called a "joint angle". According to the forward kinematics, this conversion is performed, beginning with the root, for each body part of the CG character in order in accordance with the links of the skeletal structure so as to specify a state of each body part. The state of each body part is then represented as a motion in a coordinate system (usually the world coordinate system) defining the root. In accordance with such motions of the body parts, position and direction of the character's entire body are specified. When this operation is performed at each predetermined time (i.e., for each frame rate), animation that changes over time is created. As described in Reference Document 1, the Key Frame method requires joint angle data in accordance with a frame rate. With this method, joint angle data is necessary only at each sampling time as key data, and joint angle data for other periods is calculated by interpolating the key data.

According to such conventional method, generation of motion data and animation creation control (see Reference Document 2** as one example) are performed as follows.

**Reference Document 2: Digital Character Animation, George Maestri, translated by Shoichi Matsuda, Prentice Hall, 1999.

(1) Design a CG character, define its skeletal (hierarchical) structure, and generate shape data for the character.

(2) Create a pose of the CG character (as well as a facial expression of the character) at a key time.

(3) Determine a shape of the CG character at each time according to the Key Frame method, render the determined shape using suitable lighting and camera data, and continuously display the rendered shapes to create 3D CG animation.

Consequently, as shown in FIG. 5, motion of the character's entire body and a facial expression is represented as 3D CG animation as defined by original data.

Reference Document 2 also discloses a morphing method as a facial animation method for generating a facial expression, including lip motion. Facial expression and lip motion can be created with not only the morphing method but also other methods. For instance, a plurality of textures representing different facial expressions are first generated, and then texture mapping is performed using these textures, with textures changed when necessary.

In the field of 3D CG character animation, especially animation for interactive software such as a video game, a state transition diagram such as shown in FIG. 10A is usually used so that transition is made from one motion of the CG character to another. With the above conventional method, the CG character's motions, including a basic state and motions A~D shown in FIG. 10A, are created with the above animation creation method (1)~(3). That is to say, this CG character moves in six different ways, including the basic state, according to the state transition diagram in FIG. 10A. In order to increase patterns of the character's motion, more motion data is necessary, which increases the data amount.

Here, assume that a motion for "walking while waving arms" and a motion for "sitting down on a chair" are provided to the CG animation apparatus in advance. When a motion for "sitting down on a chair while waving arms" needs to be made by the CG character, this whole motion needs to be incorporated as one of the states in the state transition diagram. The amount of data further increases when such CG character has a facial expression. When the CG character that makes a certain body motion has different facial expressions, it becomes necessary to create, for each of the different facial expressions, the same body motion data. The created body motion data can be reused, and therefore there is no trouble of repeatedly creating the same body motion data for different facial expressions. However, the total amount of data is still large. This is a critical problem to a device that has limited memory capacity. For such a device, the data amount is reduced by lessening the number of motions made by the CG character. The user of such device is therefore often bored by a very limited variety of the CG character's motions.

Holding an object, such as a tool, in one's hand is a natural and often occurring behavior of a human. However, having a CG character perform such natural behavior according to the conventional animation method involves the following problems.

The first problem is that a CG character holding an object in its hand and a character holding no object have a different skeletal structure, and therefore two types of shape data representing both states are necessary. In addition, such shape data needs to be provided for every type of an object to be carried by the CG character. The second problem is that it is necessary due to the above skeletal structure difference to also provide two types of body motion data representing a state of holding an object and a state of holding no object even when the body motion itself is the same. Consequently, even when the above two motions are similar, two types of shape data and two types of motion data are necessary, which almost doubles the data amount. If facial expressions are added to such variety of motions, the data amount will explosively increase.

The present invention is made in view of the above problems and aims to provide a CG animation apparatus capable of creating a variety of CG character animations using smaller amount of data than required by the conventional technique while minimizing the data redundancy causing the above problems.

The present invention also aims to achieve a CG animation apparatus capable of easily adding and deleting a hierarchical level and a shape element, such as an object, so as to create a CG character holding the object in its hand.

SUMMARY OF THE INVENTION

In order to solve the above problems, the CG animation apparatus of the present invention for displaying a character image includes the following units: a structure storing unit operable to store structure data showing a hierarchical structure for some of character elements that make up the character image; a table storing unit operable to store a group table showing a plurality of groups that each include some of the character elements; a motion data storing unit operable to store motion data representing motions, each of which is associated with one of the plurality of groups; and a state calculating unit operable to calculate shape data representing change in the character image over time in accordance with the motion data, the group table, and the structure data.

The above CG animation apparatus also includes an animation control unit for receiving event information relating to motions of the 3D character. In accordance with a type of the received event information, the animation control unit specifies the motion data, the group table, and the structure data. In accordance with the specified motion data, group table, and structure data, the state calculating unit calculates shape data representing change in the character image over time in accordance with the motion data, the group table, and the structure data specified by the state calculating unit.

The present invention can be also achieved as a CG animation method that includes steps taken by the units of the above CG animation apparatus.

It should be clear that that above CG animation method may be embodied as a program executed by a computer and the like. Such program may be distributed via transmission channels, including a communication network, and a recording medium storing the program, such as a CD-ROM (compact disc read only memory).

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 9 shows group tables of the present invention;

FIGS. 11A and 11B show how transition in motions and group tables for use is made for the present invention;

DESCRIPTION OF THE PREFERRED EMBODIMENTS

The following describes a CG animation apparatus as the first embodiment of the present invention with reference to drawings.

For this CG animation apparatus, a 3D CG character is divided into different element groups. The CG animation apparatus controls motion of each element group, thereby controlling motion of the entire CG character.

Figure 1:
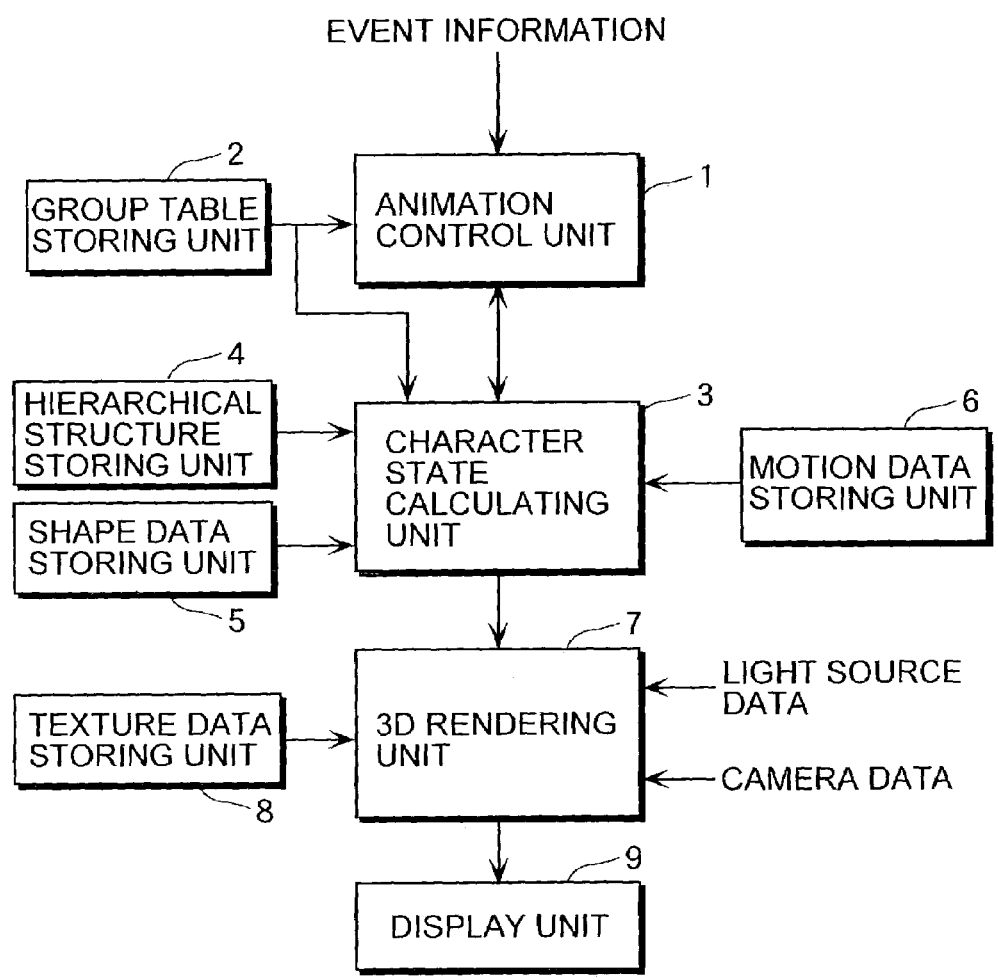
FIG. 1 is a block diagram showing the construction of a CG animation apparatus of one embodiment of the present invention.

FIG. 1 shows the construction of the CG animation apparatus of the present embodiment. The CG animation apparatus includes the following elements: an animation control unit 1; a group table storing unit 2; a character state calculating unit 3; a hierarchical structure storing unit 4; a shape data storing unit 5; a motion data storing unit 6; a 3D rendering unit 7; a texture storing unit 8; and a display unit 9. The animation control unit 1 receives event information, and sends various types of-data to the character state calculating unit 3 so as to control animation creation in accordance with the received event information. The group table storing unit 2 stores and manages element group tables. The character state calculating unit 3 receives data from other units such as the shape data storing unit 5 and makes a change to shape data representing a CG character. The hierarchical structure storing unit 4 stores hierarchical structure data defining a skeletal structure of the CG character, and manages the hierarchical structure data by using addresses. The shape data storing unit 5 stores shape data that represents the CG character and an object, and manages the stored shape data by using addresses. The motion data storing unit 6 stores motion data used for creating animation of the CG character and the object, and manages them by using addresses and motion IDs. The 3D rendering unit 7 renders CG animation. The texture storing unit 8 stores textures used for CG rendering and manages the stored textures by using addresses or IDs. The display unit 9 displays the CG animation.

The following first describes data stored in the present CG animation apparatus.

Figure 3:
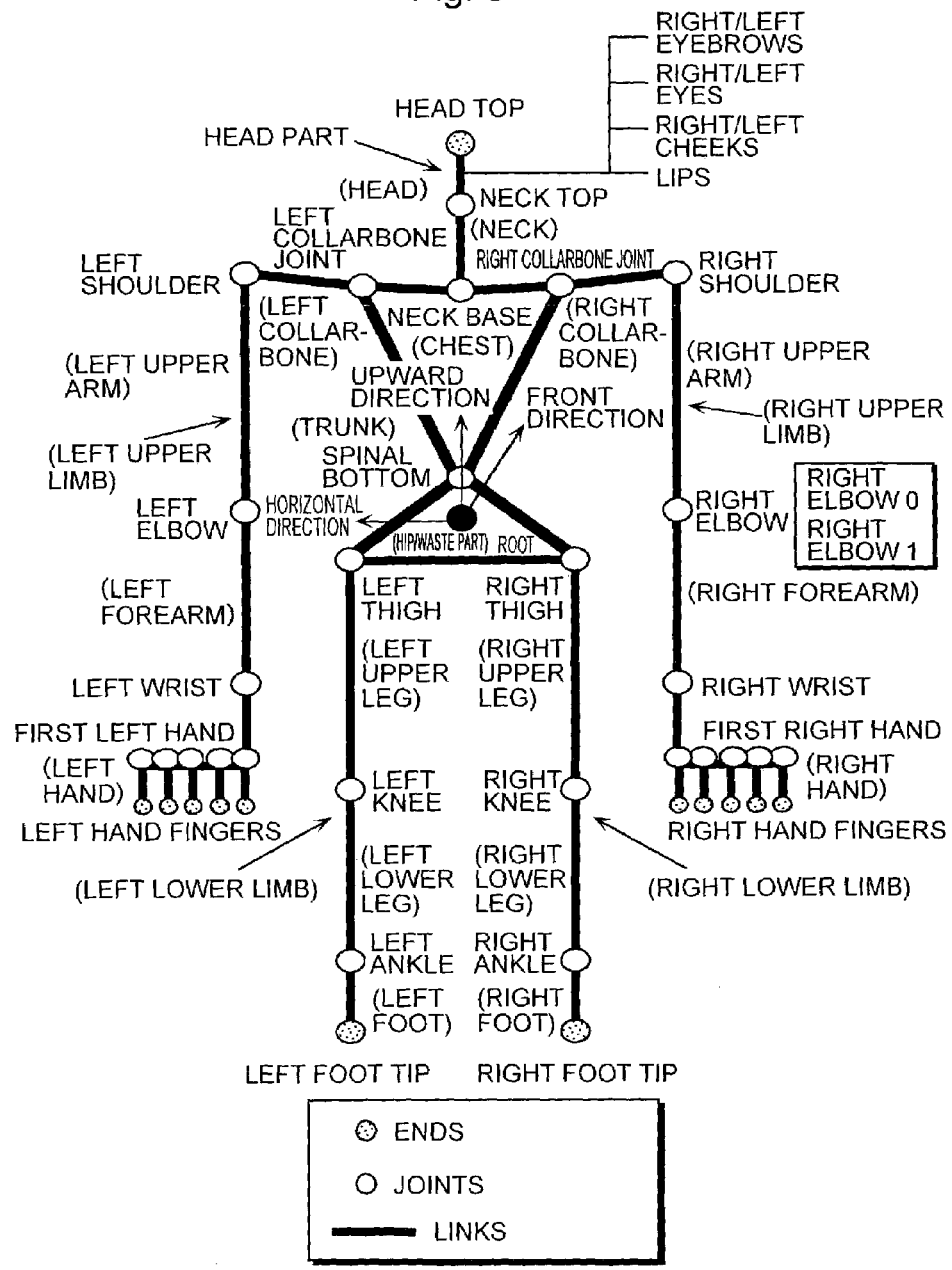
FIG. 3 shows a skeletal structure that does not include a stick as its element.
Figure 4:
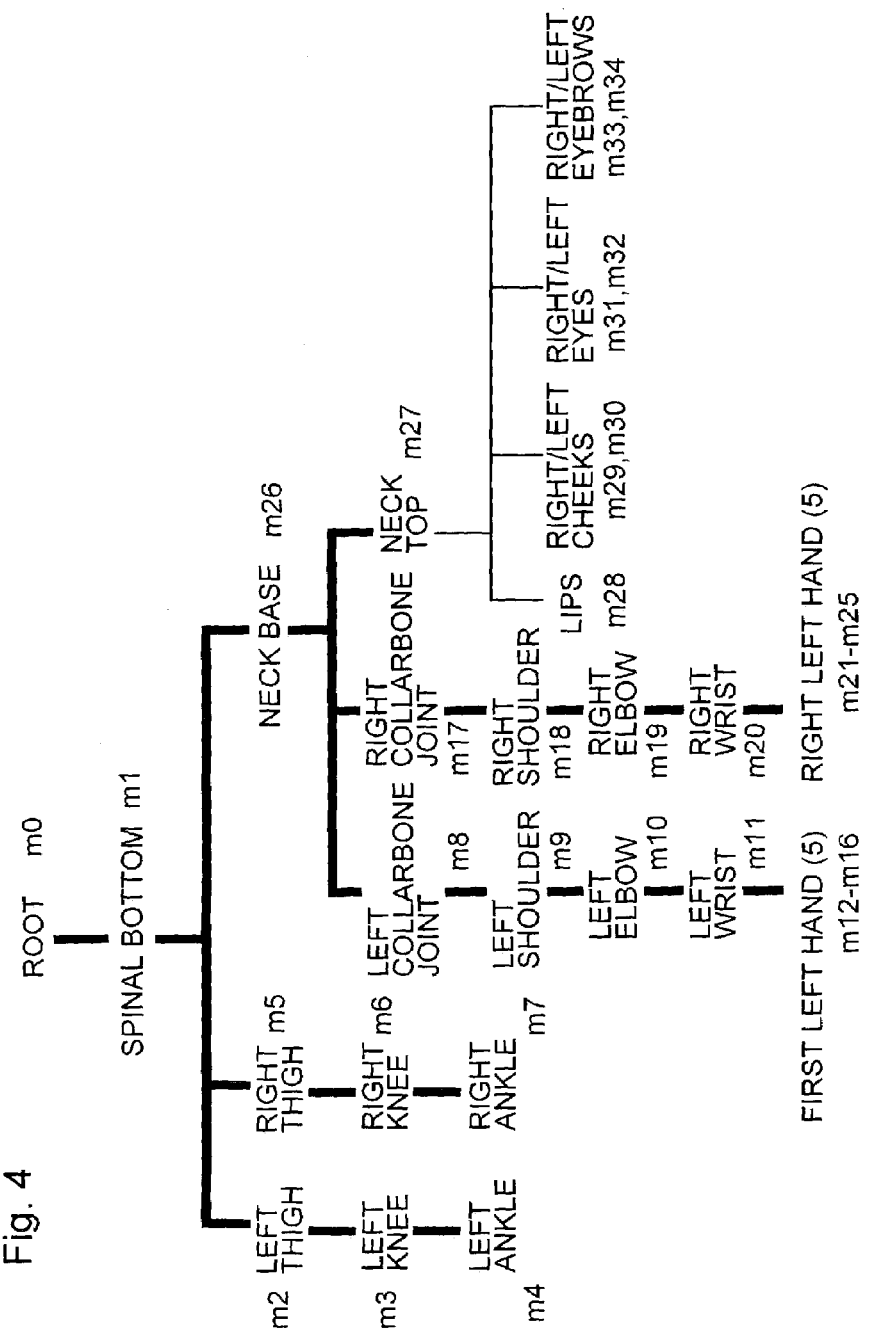
FIG. 4 shows a hierarchical structure of the skeletal structure shown in FIG. 3.

The hierarchical structure storing unit 4 stores hierarchical structure data that defines a skeletal structure of a CG character for which animation should be created. The hierarchical structure storing unit 4 manages the hierarchical structure data using addresses. For instance, when a CG character has a skeletal structure similar to that of a human, this skeletal structure is represented as shown in FIG. 3 and defined by hierarchical structure data having a linked structure as shown in FIG. 4. Such hierarchical structure data is sometimes called "Scene Graph" in the field of CG. When a character with the skeletal structure like that shown in FIG. 3 holds an object such as a stick in its hand as shown in FIG. 7, the held object needs to be defined as a part of the skeletal structure.

Figure 7:
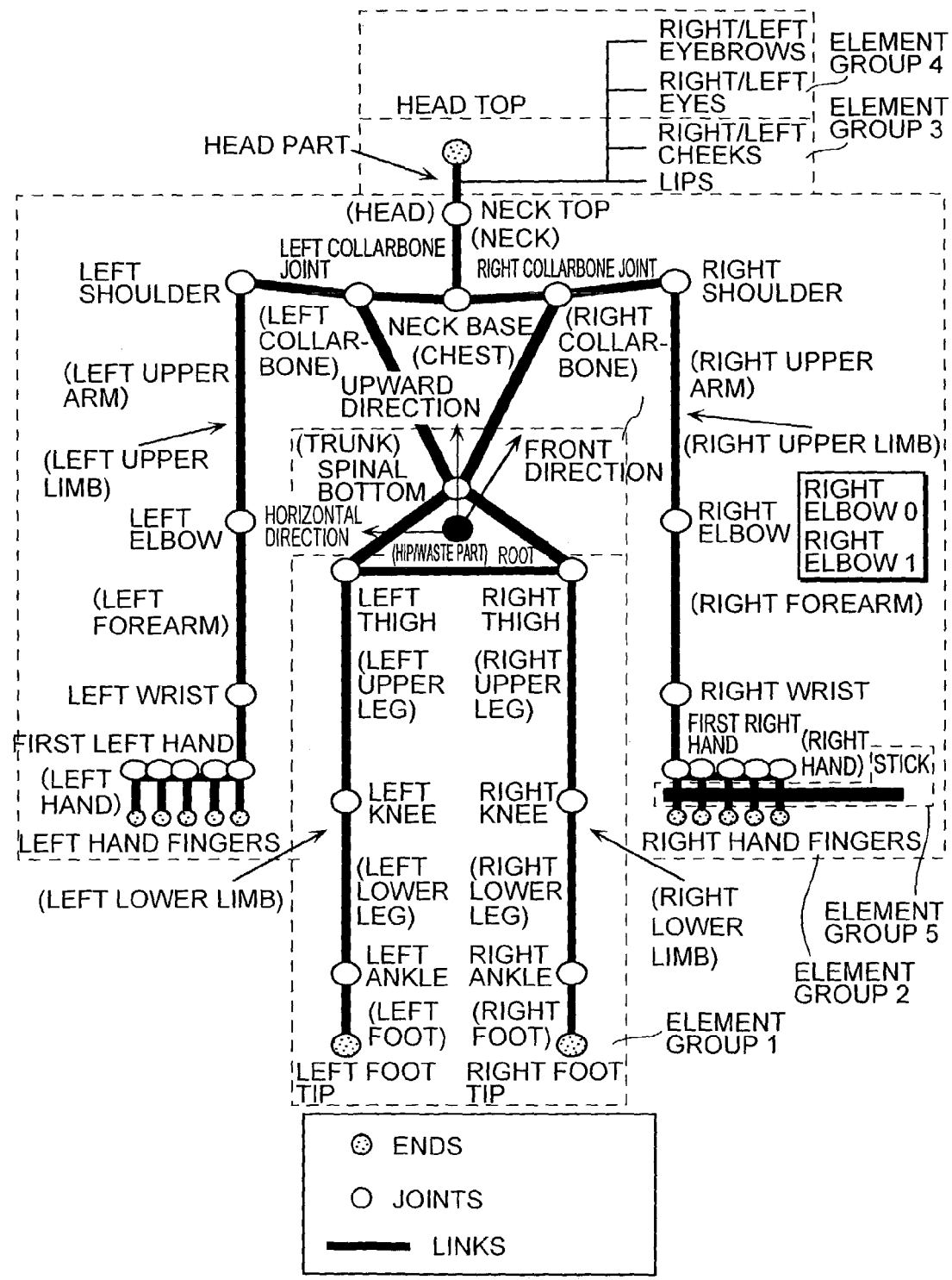
FIG. 7 shows a skeletal structure that includes a stick as its element.
Figure 8:
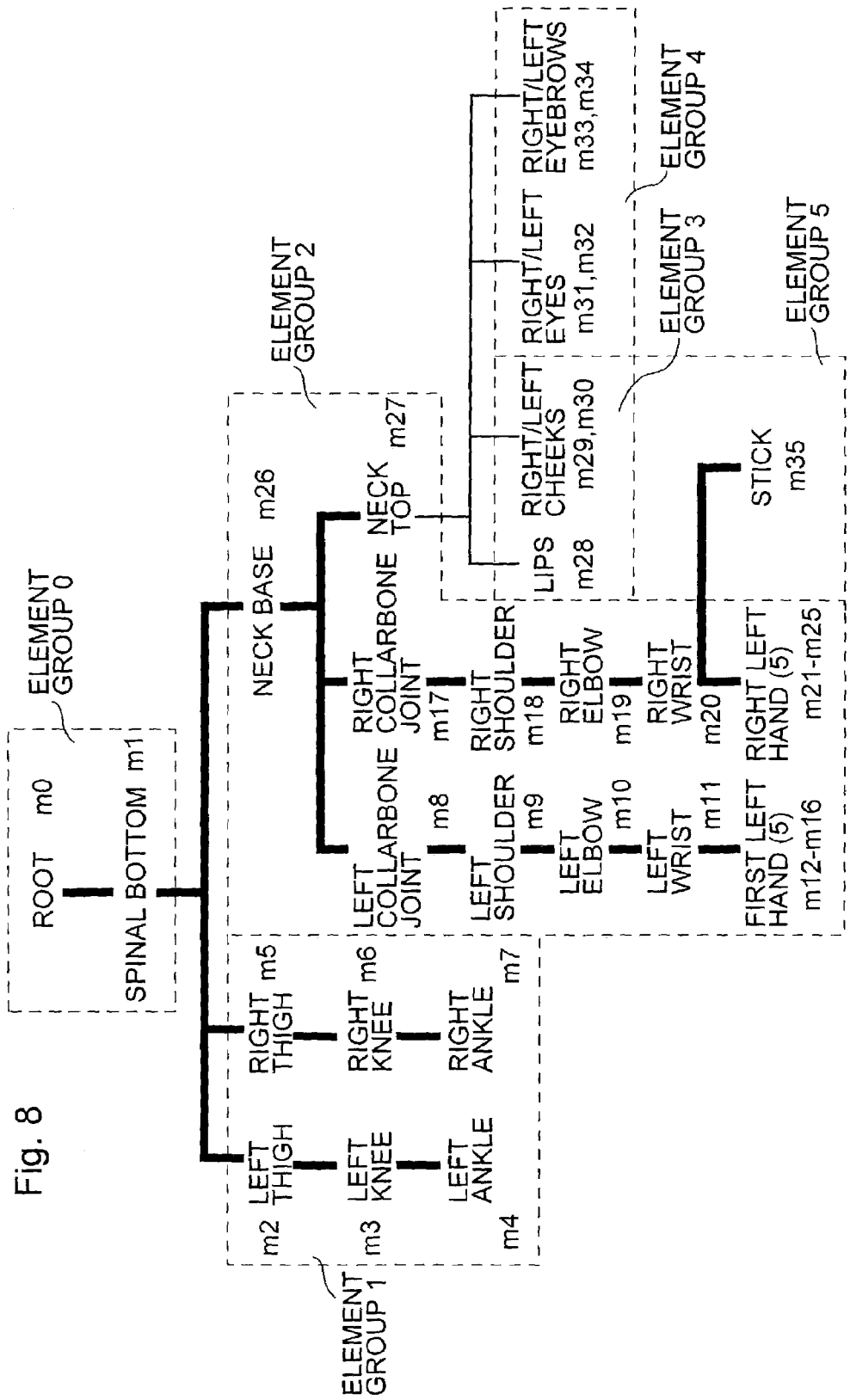
FIG. 8 shows a hierarchical structure of the skeletal structure shown in FIG. 7.

FIG. 8 shows the hierarchical structure data corresponding to FIG. 7. This hierarchical structure data is exactly the same as that shown in FIG. 3 except the part of the stick, and therefore the stick shown in FIG. 7 can be defined as a part of the skeletal structure shown in FIG. 3. When an object like the stick is thus added to the whole skeletal structure, hierarchical structure data for this object specifies the object's link destination (i.e., a right hand in the case of the stick shown in FIG. 7) in the parent hierarchical structure. Accordingly, hierarchical structure data stored in the hierarchical structure storing unit 4 are of the following three types: (1) parent hierarchical structure data; (2) hierarchical structure data for an object (hereafter called object hierarchical structure); and (3) hierarchical structure data including (a) data defining parent-child relationship between parent hierarchical structure data and object hierarchical structure data, (b) an address of the parent hierarchical structure data, and (c) an address of the object hierarchical structure data.

The hierarchical structure storing unit 4 stores the above hierarchical structure data together with type identifiers (IDs) that each indicate one of the above three types (1)~(3) of hierarchical structure data. Accordingly, the hierarchical structure storing unit 4 does not need to separately store two sets of hierarchical structure data shown in FIGS. 4 and 8. When hierarchical structure data in the hierarchical structure storing unit 4 is to be accessed, a type of hierarchical structure data is first specified using its type ID. When the specified type of the hierarchical structure data is one of the types (1) and (2) above, the hierarchical structure data is directly obtained. When the hierarchical structure data is of the type (3), the data defining parent-child relationship, and addresses of hierarchical structure data are first obtained. After this, the hierarchical structure data for the parent and the object is obtained, and then the whole hierarchical structure data is produced based on the parent-child relationship.

Figure 2:
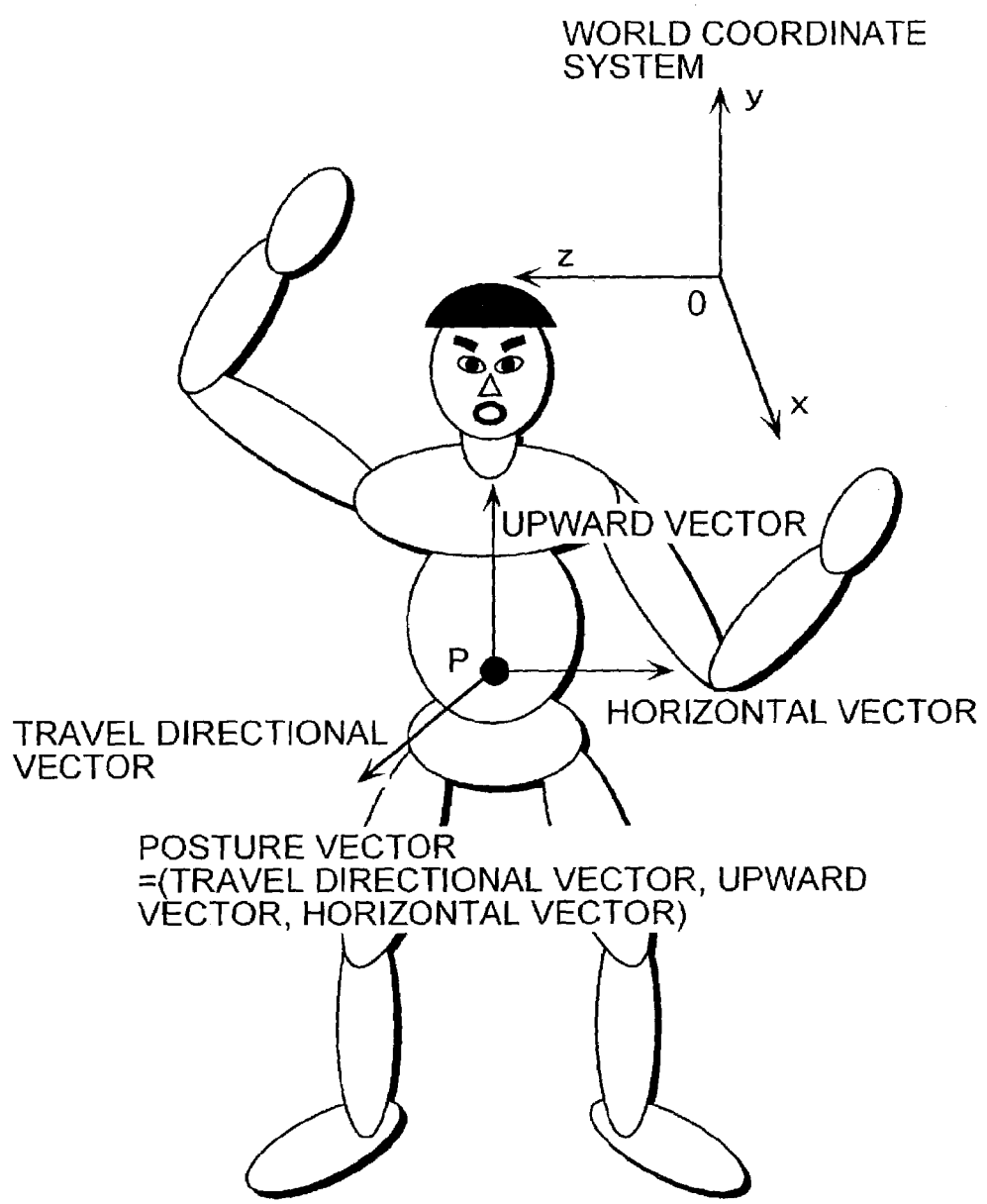
FIG. 2 shows a character shape and a posture vector in the character shape.

The shape data storing unit 5 stores data (hereafter called "shape data") representing shapes of CG characters and objects, and manages them by using addresses. The shape data is based on the above skeletal structure and represents skin and clothes that cover the skeletal structure for a human-type character like that shown in FIG. 2, for instance. The shape data is composed of shape elements, such as a head, upper limbs, a torso, lower limbs, and objects which are hierarchized in accordance with the above hierarchical structure data.

The shape data therefore also includes addresses of hierarchical structure data, which correspond to the shape data, in the hierarchical structure storing unit 4, and identifying tags specifying hierarchical structure data corresponding to each shape element.

Each shape element is usually represented by a group of polygonal planes called a surface model that approximate the surface of the shape element. The shape element includes the following: coordinates of vertexes in 3D space; a normal vector component on each vertex (essential for calculating brightness of a light source); indexed point sequence data for texture coordinates (essential for texture mapping); phase data that indicates how points of the sequence are connected (for instance, the phase data may indicate three vertex indexes "1", "2", and "3" in order. This may represent a triangle containing three vertexes "1", "2", and "3"); and attribute data, such as reflectance (defuse reflectance and mirror reflectivity) of each plane, intensity of ambient light, and colors of shape elements.

Some of the shape elements may be associated with addresses of textures in the texture storing unit 8 so that texture mapping can be performed using the textures for representing clothes and faces of a CG character.

The motion data storing unit 6 stores motion data used for creating animation of CG characters and objects, and manages the stored motion data by using addresses and motion IDs. The present embodiment uses a CG character to explain motion data for an item with hierarchical structure, although an item having the hierarchical structure is not limited to a CG character.

Motions of a CG character can be categorized into body motions and facial motions. In the present embodiment, the motion data is therefore categorized into two types consisting of body motion data and facial motion data.

As in the conventional technique for CG character animation, the body motion data represents position and posture of the entire body of the CG character in 3D space at predetermined times by using position data and direction data (i.e., posture vector shown in FIG. 2) for the root (shown in FIG. 2 as a point P, a representing point on the body) in the hierarchical structure data. The position data for the root P is generally represented by a position vector at an initial time and a travel distance vector that shows a travel distance at each predetermined time, although it is possible to directly represent the position data. The direction of the root P is specified by rotational conversion in the local coordinate system defining the root P. More specifically, this direction of the root P is specified by one of the following two sets of information: (1) a rotational angle in the three coordinate axes in the 3D space; and (2) vector components that represent the central axis of the rotation, and a rotational angle for these vector components. The body motion data for the root P is specified by a motion element ID m0 as shown in the hierarchical structure data in FIGS. 4 and 5.

Motions of other body elements, such as upper and lower limbs and a torso, are represented by time-series data for rotational angles in the axes of the local coordinate system defining joints of the skeletal structure. In the hierarchical structure data, these joints are assigned motion element IDs, such as m0, m1, m2, . . . m27. According to the conventional animation creation technique, the multivariate time-series data set for these joints m0, m1, m2, . . . m27 constitute body motion data.

Shape data of the CG character is converted in the root position and in the local coordinate system defining positions of the joints specified by the above motion element IDs consisting of m0, m1, m2, . . . m27. As a result, the position and direction of the CG character, and the posture of the character's body at each predetermined time are created, and processed as 3D images. When this operation is repeated over time, CG animation is created.

Figure 5:
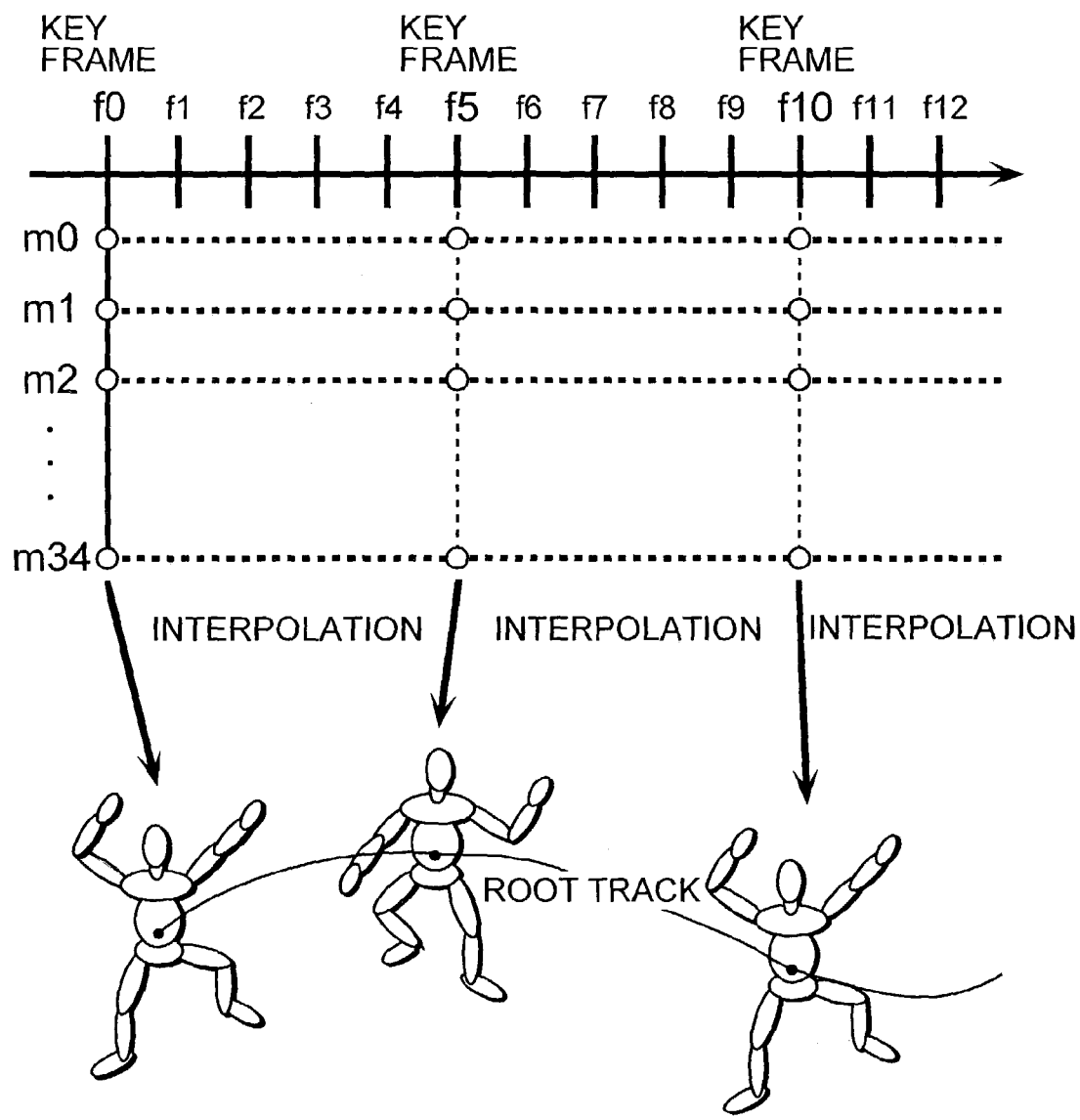
FIG. 5 shows how animation is created with the Key Frame method.

With the Key Frame method, body motion data is provided not to all the frames but only key frames, such as frames f0, f5, f10 . . . as shown in FIG. 5. The body motion data is therefore discontinuous time-series data. Body motion data for frames f~f4 and frames f6~f9 between frames f0, f5, and f10 is obtained by interpolation calculation, so that the discontinuous body motion data is time-series data indicating the above angles and travel distance through parallel translation.

As is observed in a real human face, a facial expression can be divided into motions of eyes, cheeks, mouth, and the like. In the case of the hierarchical structure in FIG. 4, for instance, facial motion can be categorized into a blink motion, a cheek motion, a lip motion, and an eyebrow motion. A facial motion is determined in accordance with a face model.

The commonly used facial animation techniques are described here, including a reshaping method for reshaping the face, and a texture method for changing a texture applied to the face.

With the reshaping method, the facial motion data is time-series data indicating a travel distance of a coordinate of a vertex corresponding to an endpoint of each of an eyebrow, an eye, and a mouth. Such travel distance may be calculated through simulation based on a facial muscular model. When a vertex to be converted is present in a plurality of conversion systems, the enveloping technique may be used. According to this technique, a weight for each conversion is given to the vertex, and the vertex is converted in each conversion system so that a plurality of vertex values are calculated. These vertex values are then converted into coordinates that are averaged in accordance with the above weights.

Figure 6:
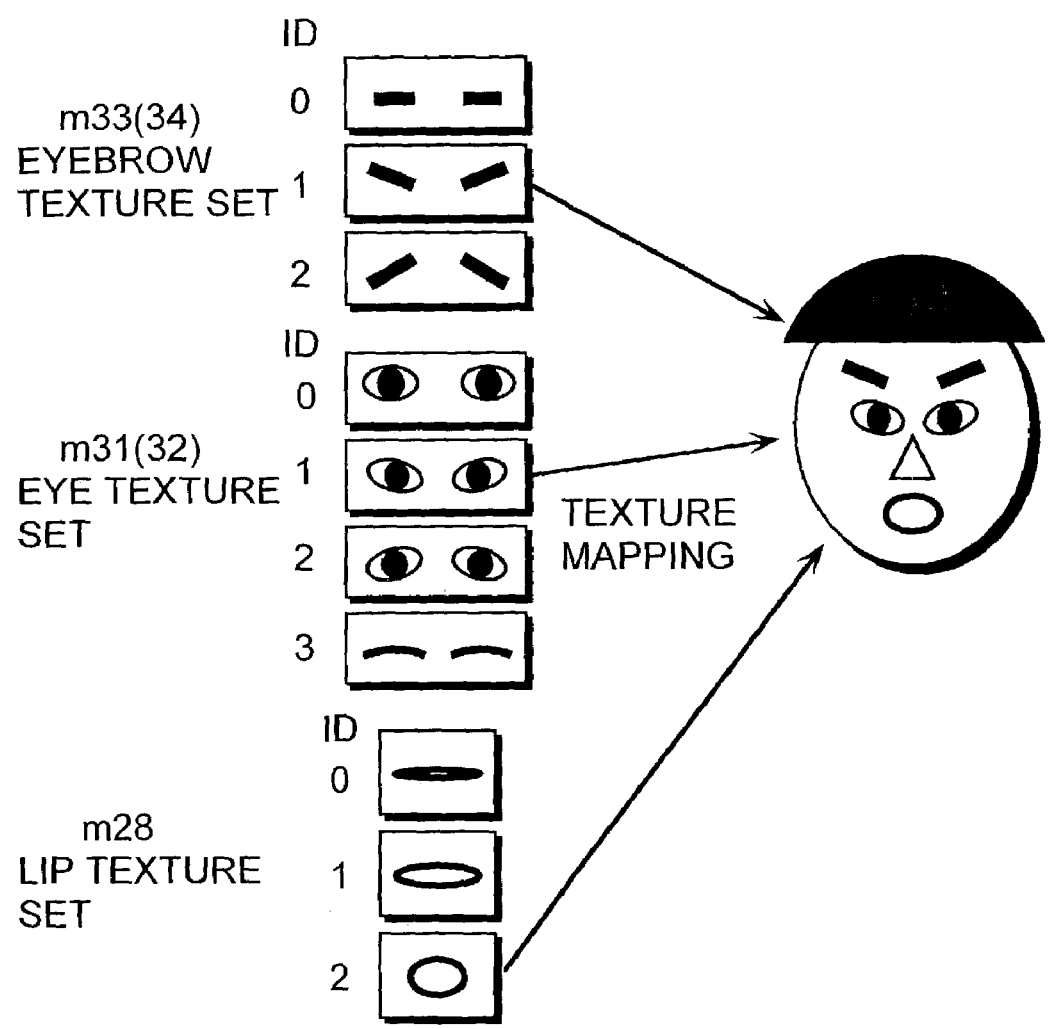
FIG. 6 shows how a facial motion is created with textures.

FIG. 6 shows the other method for generating a facial expression by changing a texture applied to the face. For this method, a plurality of textures for a smiling face, a crying face, and a face in an interim state are archived and managed using IDs. With reference to these IDs, a necessary texture is selected from the archived textures at each predetermined time, and texture mapping is performed with the selected texture to generate a facial expression. Accordingly, time-series parameters (such as frame numbers and time values) of the body motion data correspond to the managing IDs. These archived textures make up the facial motion data.

With both of the above two methods for generating a facial expression, the facial motion data is based on the hierarchical structure and therefore specified by motion element IDs as in the body motion data. In the case of FIG. 4, for instance, the facial motion data is assigned motion element IDs m28~m34.

For the present embodiment, a facial expression is generated using the archived textures for texture mapping, although other methods, such as the method for reshaping facial elements and an enveloping method, may be used by performing these methods as described for the body motion.

In the present embodiment, the hierarchical structure data is provided separately from the shape data and the motion data. However, the hierarchical structure data can be included in either the shape data or the motion data if a descriptive method for the shape data or the motion data is devised appropriately. For instance, the hierarchical structure data may be inserted into the shape data by inserting an ID of a shape element and another ID that indicates parent-child relation between this shape element and another shape element. Similarly, the hierarchical structure data may be inserted into the motion data by inserting a motion element ID and another motion element ID that indicates parent-child relation. For instance, when a shape element with the ID "1" and another shape element with the ID "2" are a parent and a child, respectively, the ID "1" may be written into a header or an area, in which attributes are written, of the shape element with the ID "2".

The group table storing unit 2 stores element group tables and manages them using either element group table numbers or addresses. As shown in FIG. 9, the element group table associates an element group ID with a plurality of motion element IDs. An element group ID of the present invention is defined independently of the linked hierarchical structure described above. A plurality of motion element IDs associated with an element group ID is hereafter called a motion element ID set.

For instance, an element group table 0 shown in FIG. 9 defines element groups 0~4 for the hierarchical structure of the CG character shown in FIG. 4. This element group table 0 indicates the following: the element group 0 containing a root m0 and a bottom of a spinal column m1 (hereafter called the "spinal bottom"); the element group 1 containing a left thigh m2 and a right ankle m7; the element group 2 containing a left collarbone joint m8, and a neck top m27; the element group 3 containing lips m28 and right and left cheeks m29 and m30; and the element group 4 containing right and left eyes m31 and m32, and left and right eyebrows m33 and m34.

The element group table 1 in the figure is provided for the hierarchical structure shown in FIG. 8, and defines element groups 0~5 as follows: the element group 0 containing the root m0 and the spinal bottom m1; the element group 1 containing a neck base m26 and the neck top m27; the element group 2 containing left-side body elements such as the left thigh m2 and the left collarbone joint m8; the element group 3 containing right-side body elements such as a right thigh m5 and a right collarbone joint m17; the element group 4 containing the lips m28, right and left cheeks m29 and m30; and the element group 5 containing right and left eyes m31 and m32, and left and right eyebrows m33 and m34.

The element group table 2 in the figure is provided for the hierarchical structure shown in FIG. 8 and defines element groups 0~5 as follows: the element group 0 containing the root m0 and the spinal bottom m1; the element group 1 containing the left thigh m2 and the right ankle m7; the element group 2 containing the left collarbone joint m8 and the neck top m27; the element group 3 containing the lips m28 and the right and left cheeks m29 and m30; the element group 4 containing the right and left eyes m31 and m32 and the right and left eyebrows m33 and m34; and the element group 5 containing a stick m35.

Division between the element groups defined by the element group table 2 is shown as dotted lines in FIGS. 7 and 8. As shown in these figures, the element group 0 contains the root m0 and the spinal bottom m1. The element group 1 contains the left thigh m2, a left knee m3, the left ankle m4, the right thigh m5, a right knee m6, and the right ankle m7. The element group 2 contains the left collarbone joint m8, a left shoulder m9, a left elbow m10, a left wrist m11, a first left hand m12~m16, the right collarbone joint m17, a right shoulder m18, a right elbow m19, a right wrist m20, a first right hand m21~m25, the neck base m26, and the neck top m27. The element group 3 contains the lips m28 and the right and left cheeks m29 and m30. The element group 4 contains right and left eyes m31 and m32 and the left and right eyebrows m33 and m34. The element group 5 contains the stick m35.

For the CG animation apparatus of the present invention, some of shape elements that make up the CG character are grouped into element groups that each include at least two shape elements. Data such as motion data is then provided to each of these element groups so as to control motion of the entire CG character. Accordingly, it is no longer necessary to provide data to every shape element of the CG character to represent each motion of a CG character as in the conventional Key Frame animation technique. The character state calculating unit 3 assigns motion data to each element group, and calculates shape data on which changes in the CG character over time are reflected.

For displaying a CG character that walks while laughing, for instance, the conventional CG animation apparatus needs to assign data representing this state to all the shape elements that make up the CG character. With the present invention, however, the CG character is divided into element groups that each include a plurality of elements, so that motion data representing walking motion and motion data representing laughing expression are only assigned to appropriate element groups. With this method, shapes of the CG character are changed in units of element groups. Accordingly, it is no longer necessary to provide new data to all the shape elements making up the CG character for representing each motion. The present invention therefore minimizes the data redundancy and creates a variety of CG character animations using a small and appropriate amount of data.

With the conventional CG animation technique, data is assigned to all the elements that make up the CG character, and this can complicate motions of the CG character. However, the CG animation apparatus of the present invention assigns data to each element group, which can limit motions of the entire CG character to only meaningful ones.

Moreover, with the element group table, different motion data can be chosen for use according to each element group ID. Note that if the above element group table only contains a single element group ID, the above technique becomes equivalent to the conventional Key Frame method. The maximum number of element group IDs included in an element group table is the total of the motion element IDs.

The texture storing unit 8 stores textures for CG creation and manages them by using either addresses or IDs. The stored textures include data used for generating facial expressions described above, clothes to be added to the shape data, and background. The archived textures are usually compressed/uncompressed color images in RGB (red, green, blue), YUV (Y-signal, U-signal, V-signal), or the like. If the stored textures are compressed, they need to be expanded before texture mapping.

The following describes animation creation operation of the present embodiment.

The animation control unit 1 stores (or receives) the following data: addresses of shape data for a CG character for which animation is created; addresses of shape data for an object created with the CG character; addresses of hierarchical structure data for the CG character and the object; an address of an element group table to be used; body motion pattern data (described later); and facial motion pattern data (described later). When animation is created for a plurality of CG characters, the above pattern data is provided to each CG character. If the different CG characters make the same motion transition, however, the body motion pattern data and the facial motion pattern data may be shared by the different CG characters.

An element group table used for CG animation creation may be restricted to one group table, although the present embodiment describes the case in which an element group table for use changes in response to input of event information. For instance, the event information may be voice analysis result, or indicate that there is an input via keys or that the CG character comes into contact or collides with another object. The content of the event information is determined in accordance with the system, but can be freely set for the present embodiment. Note that information on such transition of element group tables is stored beforehand as a part of a scenario. For instance, when event information on an event P is inputted, the animation control unit 1 refers to the scenario to specify an operation responding to the event P. When the specified operation indicates changing of element group tables, the group table transition is made. This scenario also includes information that relates to transitions in body motion (body motion pattern data), facial motion (facial motion pattern data), and object motion (object motion pattern data).

Figure 10A:
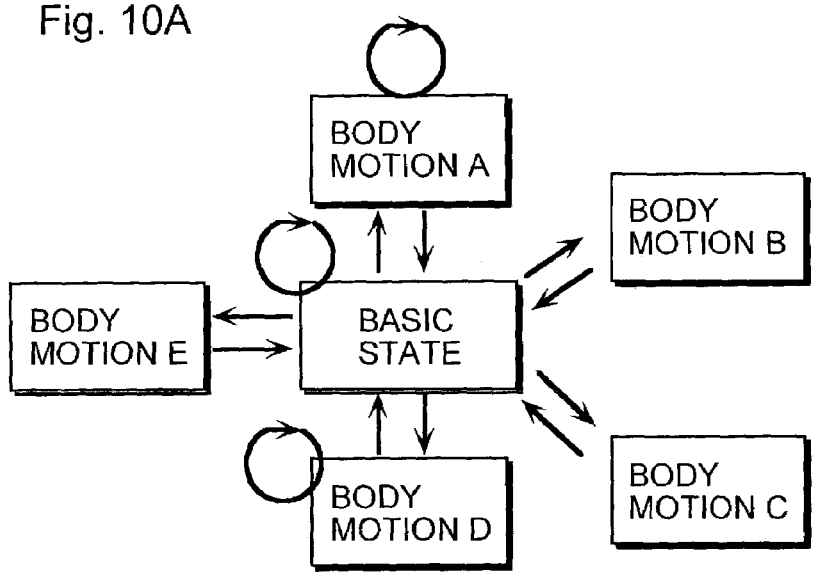
FIG. 10A shows body motion pattern data of the present invention.

The body motion pattern data is finite-state graph data as shown in FIG. 10A, and indicates possible transitions from one motion (data) to another. The body motion pattern data also includes motion information showing the following: a motion ID; a data type; an address and a number of frames of each body motion (data); and a transition probability. For instance, the body motion pattern data shown in FIG. 10A indicates that transition from a basic state to one of motions A, B, C, D, and E is possible. As soon as a predetermined event occurs or a certain operation ends while a CG character is in the basic state, one of the motions A~E is selected through random number generation based on the transition possibility written in the motion information. The selected motion is then obtained with reference to the address of the motion. This transition is made in a unit of an element group specified by an element group ID related to body motion shown in an element group table.

Figure 10B:
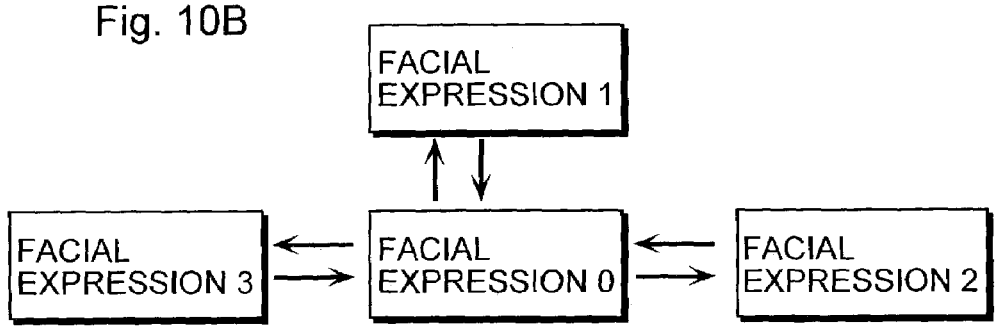
FIG. 10B shows facial motion pattern data of the present invention.

The facial motion pattern data is finite-state graph for facial motion transition. Like the graph data for body motion, the facial motion pattern data indicates possible transitions from one set of facial motion data to another, and includes facial expression information showing the following: a facial motion ID; a data type; an address and a number of frames for each set of facial motion data; and a transition probability. For instance, the facial motion pattern data shown in FIG. 10B indicates that transition from a basic facial expression 0 to one of facial expressions 1, 2 and 3 is possible. The transition destination is selected based on the transition probability written in the facial expression information. The data type written in the facial expression information specifies whether a type of facial motion data is a texture or data used with the reshaping method. In accordance with this data type, a facial motion can be created with either the texture method or the reshaping method. This can be achieved, for instance, by using the first digit of a field of the data type for indicating whether the facial motion data is either a texture or data used with the reshaping method and by using the second and subsequent digits as ID numbers for reshaping shapes. A facial expression can be thus created with both the texture method and the reshaping method.

When oral motions, such as lip and cheek motions, are separated from other facial motions to synchronize them with sound, the following control technique is used instead of the above method using the facial motion pattern data. Such lip synchronization is performed the element group 3 in the element group table 0 containing motion element IDs m28, m29, and m30. This control technique is described here with the assumption that a result of voice analysis is inputted as the event information and that the voice analysis result includes results of sound intensity analysis and phonemic analysis. Although the phonemic analysis is performed only for vowels in the explanation below, analysis for consonants can be performed in the similar way.

Textures corresponding to sounds "あ" (pronounced as "Ah"), "い" ("ee"), "う" ("ooh"), "え" ("eh"), "お" ("o"), and "ん" ("n" in "man") are provided as motion data for lips and cheeks. For each of sounds "あ", "い", "う", "え" and "お" textures corresponding to lip/cheek motions of different degrees are provided. With reference to the current event information, a vowel type and intensity of the sound are specified. From textures corresponding to the specified vowel, a texture corresponding to the degree of the motion specified by the sound intensity is selected. Selection of this texture as the lip motion data or the cheek motion data achieves lip synchronization.

When lip synchronization is performed with the method for reshaping a facial element, a reshaping amount appropriate for the results of sound intensity analysis and vowel analysis can be selected in a similar way to the above. In this case, frame delay by at least one frame is caused. However, such delay is not a problem to human's sense of sight since the one-frame delay only corresponds to about 30-millisecond (msec) delay when the frame rate for CG animation is 30 frames/second.

Figure 10C:
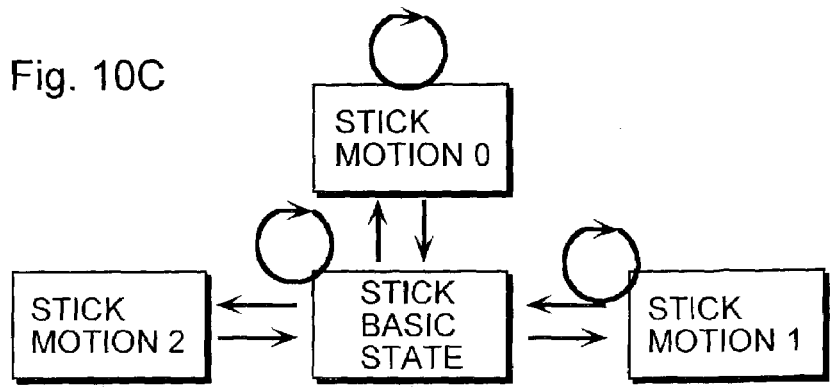
FIG. 10C shows stick motion pattern data of the present invention.

In the present embodiment, the aforementioned stick is used as an object carried by the CG character, and therefore motion pattern data that represents transition of stick motions is also stored. A type of such object is of course not limited to the stick and other types of objects may be used. It is also possible to provide a plurality of objects. FIG. 10C is a transition graph used for controlling transition of the stick motion. This transition graph defines transition from a basic state to stick motions 0, 1, and 2 in the similar way to the transition graph for the body motion.

The following describes motion transition in accordance with the transition probability, although the above lip synchronization and selection of motion may be performed in a fixed manner. In this case, a predetermined scenario for the transition is provided in advance so that each motion is selected in accordance with the provided scenario.

FIGS. 11A and 11B show transition state of motions and element group tables based on a predetermined scenario. With reference to these figures, the following specifically describes animation creating operation of the present embodiment.

The animation control unit 1 controls the following operations: (1) managing "rendering frames" of animation images; (2) managing addresses of motion data that are specified by each element group ID and that are used for generating the next image frame, and managing frame numbers in the motion data; (3) managing the event information and performing operation in accordance with the event; (4) controlling transition of motion of each element group specified by each element group ID for the CG character; (5) sending addresses of shape data for the CG character and the object and addresses of hierarchical structure data corresponding to the shape data to the character state calculating unit 3 (with this operation performed only once before creation of CG animation); (6) sending either an element group table number or an address of an element group table for use to the character state calculating unit 3 (with this performed at the start of rendering and when the element group table is replaced with another element group table); and (7) sending, to the character state calculating unit 3, addresses of motion data that are specified by each element group ID and that are used for generating the next image frame, and a frame number in the motion data.

In more detail, the animation control unit 1 first sends, to the character state calculating unit 3, addresses of: (a) shape data for the CG character; (b) hierarchical structure data corresponding to the shape data; (c) shape data for an object if the object exists; and (d) hierarchical structure data corresponding to the shape data for the object. When CG animation for a plurality of CG characters and objects is created, addresses for the plurality of characters and objects are sent. According to the scenario shown in FIG. 11A, the element group table 0 is first selected. Consequently, sets of body motion data in the basic states are selected as initial frames for the element groups 0, 1, and 2. For element groups 3 and 4, the facial expression 0 is selected. This selection result is sent as state information to the character state calculating unit 3.

The state information lists the following information: the element group ID 0; the address of the body motion data (currently representing the basic state); the frame number 0; the element group ID 1; the address of the body motion data (representing the basic state); the frame number 0; the element group ID 2; the address of the body motion data (representing the basic state); the frame number 0; the element group ID 3; the address of the facial motion data (representing the facial expression 0); the frame number 0; the element group ID 4; the address of the facial motion (representing the facial expression 4); and the frame number 0.

When the CG animation including a plurality of CG characters is created, state information is sent to the character state calculating unit 3 separately for each CG character.

By referring to the address of the hierarchical structure data for the CG character sent by the animation control unit 1, the character state calculating unit 3 obtains the hierarchical structure data from the hierarchical structure storing unit 4. By referring to the sent address of the shape data, the character state calculating unit 3 obtains the shape data from the shape data storing unit 5. The character state calculating unit 3 also obtains the element group table (i.e., the element group table 0 for the current example) from the element group table storing unit 2 by referring to either the sent address or the element group table number. By referring to the sent state information and the obtained element group table, the character state calculating unit 3 also obtains motion data from the motion data storing unit 6.

The following describes the above operation for obtaining the motion data in detail. The character state calculating unit 3 refers to the obtained element group table 0 to find that the element group ID 0 is associated with motion element IDs m0 and m1. The character state calculating unit 3 then refers to the address of the body motion data written in the state information, and obtains this body motion data, which currently represents the basic state, from the motion data storing unit 6. The state calculating unit 3 then refers to the found motion element IDs m0 and m1 and the frame number in the state information, and obtains body motion data, which corresponds to a frame and is specified by the motion element IDs and the frame number. When the Key Frame method is used here, the initial frame is stored as immediate values. However, some of other frames are between key frames. For calculating such a frame, the character state calculating unit 3 obtains the following two frames: (a) a frame with the largest frame number of all the frames that have lower frame numbers than the frame to be calculated; and (b) a frame with the smallest frame number of all the frames that have larger frame numbers than the frame to be calculated. After this, linear interpolation is performed using the two obtained frames, so that body motion data with the above frame number is generated. When such body motion data is generated using a higher order (second or higher) polynomial expression as in spline interpolation, sets of key frame data whose number is the same as the degree of the polynomial expression can be obtained as follows. The character state calculating unit 3 obtains frames with frame numbers that are the largest, second largest, third largest, etc. of all the frames that have lower frame numbers than the frame to be calculated. The character state calculating unit 3 also obtains frames with frame numbers that are the smallest, second smallest, third smallest, etc. of all the frames that have larger frame numbers than the frame to be calculated.

Similarly for the element groups 1 and 2, the character state calculating unit 3 obtains body motion data from the motion data storing unit 6. From the obtained body motion data, the character state calculating unit 3 obtains body motion data specified by the frame number in the state information and by the motion element IDs associated with the element group IDs 1 and 2 in the element group table 0. After this, by using the obtained body motion data (i.e., joint angle data) and the hierarchical structure data, the character state calculating unit 3 performs matrix conversion on the obtained shape data in local coordinate systems that define each shape element so that shape data based on forward kinematics is produced. After this, in accordance with the travel distance and direction of the body motion data for the root m0 in the element group 0, rotational conversion and parallel translation conversion are performed on the entire shape data for the CG character. This generates converted shape data of the CG character whose direction and position are corrected. Here, the enveloping method may be used for converting the shape data so that an image with a smooth surface without any breaks can be generated.

After this, facial motion is created for element groups 3 and 4. When the facial motion is created with either the enveloping method or the reshaping method, the character state calculating unit 3 corrects the shape data in the similar way to that described above for the body motion. With the method for creating the facial motion data using archived textures, an address of a texture in the texture storing unit 8 corresponds to the address of the facial motion data, and a managing ID of the archived texture corresponds to a frame number. This address and the managing ID are written into a certain area that is used for designating the texture (such as for lips, right and left cheeks, right and left eyes, and right and left eyebrows) and that is in the newly generated shape data whose position, direction, and other motion states have been corrected.

The shape data corrected by the character state calculating unit 3 is sent to the 3D rendering unit 7. The character state calculating unit 3 also detects, if necessary, contact and collision state of the CG character with other objects, such as another CG character and the background. When correcting the shape data as described above, the state calculating unit 3 may also perform calculation to judge whether the CG character is in contact with other objects. As the shape data of the CG character is usually very complex, the shape data of the CG character and of the background may be simplified by using a boundary box or a boundary sphere before contact judgment. The boundary box refers to the smallest possible rectangular parallelepiped box that encloses the character shape and the like, and the boundary sphere refers to the smallest possible sphere or elliptic sphere that encloses the character shape and the like.

The 3D rendering unit 7 receives the sent shape data, and obtains the texture designated in the shaped data. The 3D rendering unit 7 also receives light source data and camera data from the periphery. By using the obtained shape data, texture, light source data, and camera data, the 3D rendering unit 7 generates images in the same manner as performed for the standard 3D CG processing. The generated images are sent to the display unit 9 and displayed. For instance, the 3D rendering unit 7 renders the images by performing Gouraud shading and Z-buffer operation. Before displaying the images, the 3D rendering unit 7 calculates brightness of each vertex for the shape data by using the light source data, and performs view conversion and projection conversion (and clipping if the calculating amount needs to be reduced). The state calculating unit 3 then reads the designated texture from the texture storing unit 8, and performs texture mapping.

Colors of the shapes are calculated as follows. A color of each vertex is calculated by multiplying a color designated in the shape data by the calculated brightness. Colors of portions between vertexes are calculated by linear interpolation. For colors in portions where texture mapping is performed, the 3D rendering unit 7 calculates, using mapping coordinates designated by the shape data, a position on which the texture is applied. The 3D rendering unit 7 then adds the brightness value to the shape data.

Through the above operation, a color (such as in RGB and YcbCr) of pixels that make up an image is specified and the image is generated. The generated image is sent to the display unit 9 and displayed. The above operation generates an image for a frame and is repeated until all the motion data for each element group is processed.

The following describes operation performed when motion data for an element group is completed. In the case shown in FIG. 11A, for instance, processing of body motion data for element groups 0, 1, and 2 ends earlier than that of facial motion data for element groups 3 and 4. Such end of the motion data is detected by operation performed by the animation control unit 1 to manage rendering frames. In more detail, the animation control unit 1 detects the end of the motion data when detecting that a frame number for the next image frame becomes larger than the end frame number of the motion data. On detecting the end of the body motion data, the animation control unit 1 changes motion data to process for the present element group. The following describes such transition in motion data for the element groups 0, 1, and 2 in accordance with the body motion pattern data shown in FIG. 10A.

Here, assume that the transition is made at random from one motion to another, with the same transition probability (i.e., a one-sixth probability) assigned to each motion. In this case, transition can be made from the basic state to one of six motions including the basic state. Modulo calculation using "6" is therefore used. It is then decided that transition is made to the basic state when the remainder is "0" and to motions A, B, C, D, and E when the remainder is "1", "2", "3", "4", and "5", respectively. Under this condition, the animation control unit 1 performs the following calculation for transition: (1) generation of a random number; (2) dividing the random number by "6"; (3) specifying a remainder of the division; (4) making transition to a motion indicated by the specified remainder.

When a different transition probability is assigned to each motion, transition destination can be calculated in the similar way to the above. That is to say, a transition probability to each motion is represented by a fraction (a decimal should be converted into a fraction). These fractions are then represented with the same denominator that is the common multiple of original denominators. A line segment is divided into a number of segments equal to the numerators of the fractions. A random number is generated and divided by the common multiple to produce a remainder. One of the line segments corresponding to the produced remainder is specified, and a motion indicated by this segment is determined as the transition destination.

Although the above operation determines a transition destination in random manner, the aforementioned scenario may decide to which motion the transition should be made in response to occurrence of an event. For instance, assume that lip motion for "あ" needs to be always followed by lip motion for "い". In this case, the lip motion data for "い" is designated as an event so that compulsory transition is always made from the lip motion for "あ" to the lip motion for "い". Such compulsory transition and random transition may be combined together. For example, a higher transition probability is assigned to a certain motion than to other motions so that this transition can be made with a higher probability in response to occurrence of a certain event, with other motions assigned lower transition probabilities than a normal probability. A random number such as described above is then generated to select one of the motions in accordance with the above assigned transition probabilities. Consequently transition is more likely to be made to the above certain motion data, but unlike the compulsory transition, this transition is not always made. This loosens rigid transition made in response to an event and provides a CG character with a natural capricious aspect as observed in a real human.

As a result of such transition performed for the case of FIG. 11A, the element group 0 makes transition to motion data A, the element group 1 makes transition to motion data B, and the element group 2 makes transition to motion C. Similarly for facial motion, the element group 3 makes transition to facial motion data 0 to 2, and the element group 4 makes transition from facial motion 0 to 3. When such operation is repeatedly performed, CG character animation is produced.

The following describes transition of element group tables with reference to FIGS. 11A and 11B. For the present embodiment, it is decided beforehand in the scenario that the transition is made from the element group table 0 to the group table 1 in response to occurrence of the event P (see FIG. 11A), and another transition is made from the element group table 0 to the group table 2 in response to occurrence of the event Q (see FIG. 11B). As mentioned earlier, the events P and Q can be basically anything, such as the input with keys, voice analysis result indicating that a CG character has become a predetermined state, and contact or collision of the character with other objects. The content of the event is determined in accordance with the system.

The scenario may also include, as an event, a result of presuming emotion so that such presumed emotion is reflected in character's motion. For instance, this emotion presumption presumes voice of a person talking on a mobile phone by using a frequency signal including prosody, amplitude, and the stress. The animation control unit 1 designates motion data specified by the presumed speaker's emotion, such as anger, sorrow, and joy, so that the character state calculating unit 3 reshapes shape data in accordance with the presumed emotion, and the speaker's emotion is reflected in the CG character displayed on the screen. The CG character moving in accordance with the speaker's emotion provides more entertainment aspect to the CG animation apparatus of the present invention.

The following description is given with reference to FIG. 11A. As soon as the event P occurs at a time indicated in the figure, the animation control unit 1 is notified either by the character state calculating unit 3 or from the periphery that the event P has occurred. On receiving the notification, the animation control unit 1 prepares for making transition from the element group table 0 to the group table 1 in accordance with the scenario. The most important in this operation is to synchronize motions of different element groups. The animation control unit 1 has the element group 0 make transition to the basic state as soon as the current motion D ends.

Similarly, the animation control unit 1 has the element group 1 make transition to the basic state as soon as the current motion E ends. Likewise the element group 2 makes transition to the basic state after the motion A ends. The element groups 3 and 4 make transition to facial expression 0 after operation for the facial expressions 1 and 2, respectively, ends. After all the transitions have been made, the element group table 0 is replaced with the group table 1 at a time indicated in the figure as "Table Transition Time for Event P".

Although the element group tables 0 and 1 include a different number of element groups that each include a different motion ID set, continuous CG animation creation can be performed after the transition to the element group table 1 because animation creation is continued by handling the element group table 1 as the initial element group table. CG animation is thereafter created with motions of the CG character changed in accordance with the transition probability.

In the case of FIG. 11B, the same operations as the above are performed for the element groups 0 to 4 in accordance with the element group table 0. For operation in accordance with the element group table 2, however, change is also made to the hierarchical structure. That is to say, the shape element for the stick (i.e., an element group 5) is added to the hierarchical structure. Immediately after the transition is made to the element group table 2, the stick is in the basic state, and then its motion is changed in the same way as described above. After the transition is made to the element group table 2, CG animation creation can be continuously performed because this operation is performed by handling the element group table 2 as the initial element group table. CG animation is thereafter created with motions of the CG character and the object changed in accordance with the transition probability.

As has been described, a CG character is divided into element groups that each include a plurality of shape elements. The motion data storing unit 6 stores a plurality of sets of motion data, each of which is associated with a different element group. According to the scenario, the character state calculating unit 3 assigns a set of motion data to each element group in time sequence, and calculates shape data that reflects changes in the shape of the entire CG character over time. The 3D rendering unit 7 applies a texture to the shape data and creates a 3D image of the CG character. The display unit 9 displays the created 3D image on the screen.

If it is not desirable for the stick image to suddenly appear on the screen, the stick image may be included in the original animation. The event Q may be set as an occurrence of a state in which the stick is in contact with another animation object so as to avoid the sudden appearance of the stick image on the screen. All of this is determined beforehand by the scenario. When the CG animation relates to a scene where something like a magic is used, the stick image may suddenly appear on the screen such as by flying in in the air.

A transition from the element group table 2 to the group table 0 is also possible in the similar way to the above. This transition involves deletion of the shape element from the hierarchical structure, while the transition from the element group table 2 to the group table 0 involves addition of the shape element to the hierarchical structure. Although the above explanation uses, as an example of an object, the stick that has a single-level hierarchical structure, other shape elements with a hierarchical structure of a plurality of levels may be also processed in the similar way to the above.

Figure 12:
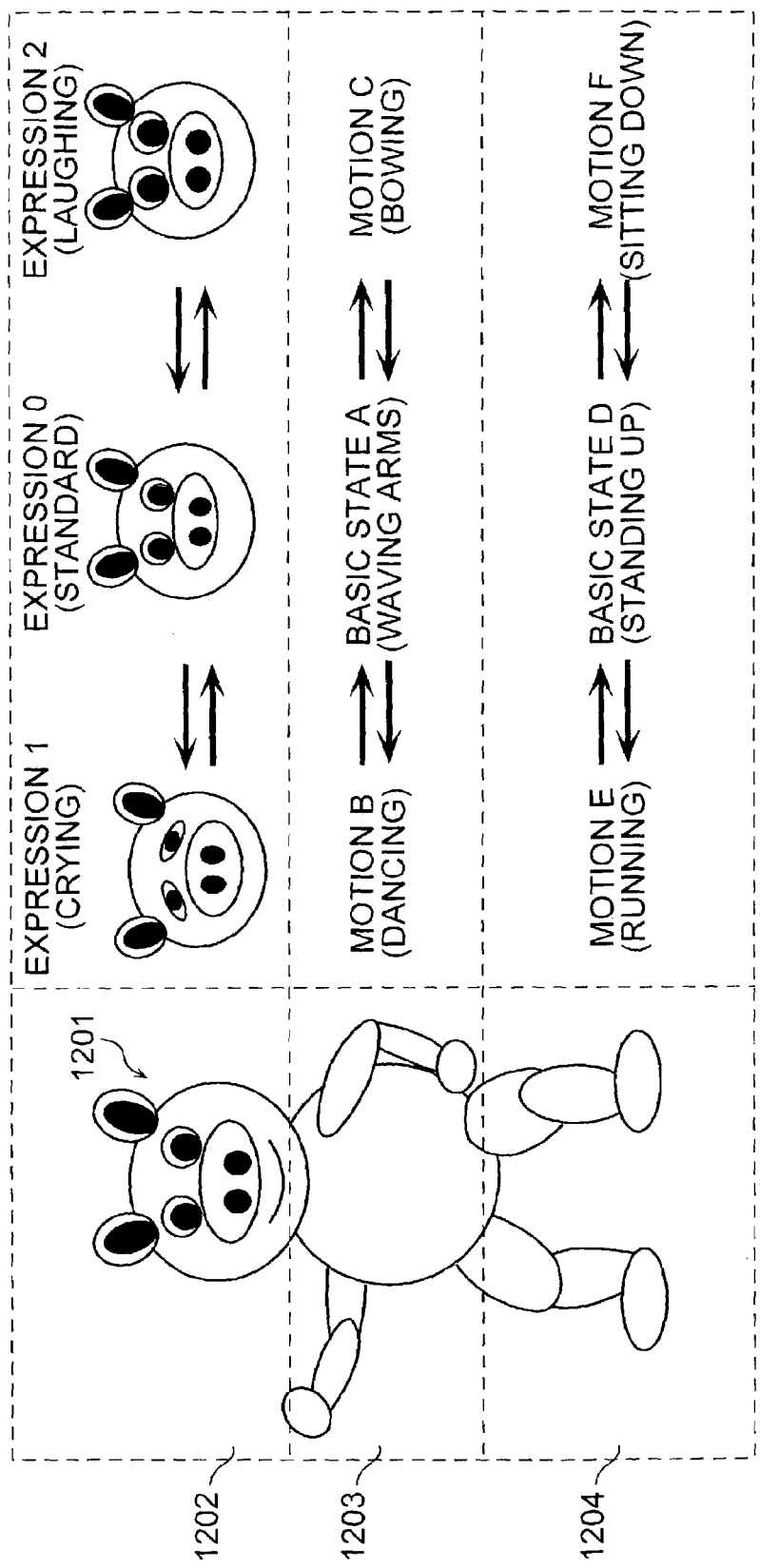
FIG. 12 shows an example case for changing motion of a CG character by using a plurality of element groups.

FIG. 12 shows an example case in which motion of a CG character 1201 changes by using a plurality of element groups. The CG character 1201 is divided into the following three element groups: an element group 1202 for a face; an element group 1203 for an upper body; and an element group 1204 for a lower body. Each of the element groups 1202, 1203, and 1204 is associated with three types of motion data, although this is not necessary for the present invention.

In more detail, the element group 1202 for the face is associated with three sets of facial motion data representing the following three facial expressions: a facial expression 0 representing a standard face; a facial expression 1 representing a crying face; and a facial expression 2 representing a laughing face. The element group 1203 for the upper body is associated with three sets of body motion data representing the following three body motions: a motion A for waving arms; a motion B for dancing; and a motion C for bowing. The element group 1204 for the lower body is associated with three sets of body motion data representing the following three body motions: a motion D for standing up; a motion E for running; and a motion F for sitting down. As each of the three element groups 1202, 1203, and 1204 is associated with three types of motion data, the CG character 1201 can make 27 different motions.

In this way, a plurality of element groups, each of which includes elements making up a CG character, are defined for the CG animation apparatus of the present invention, with each element group associated with sets of motion data. This not only makes it possible to control the movement of the entire CG character by using small amount of data but also enables complex motions of the CG character. This prevents the user of the CG animation apparatus from being bored in a short time by the very limited number of variations of the CG character's motions.

Figure 13:
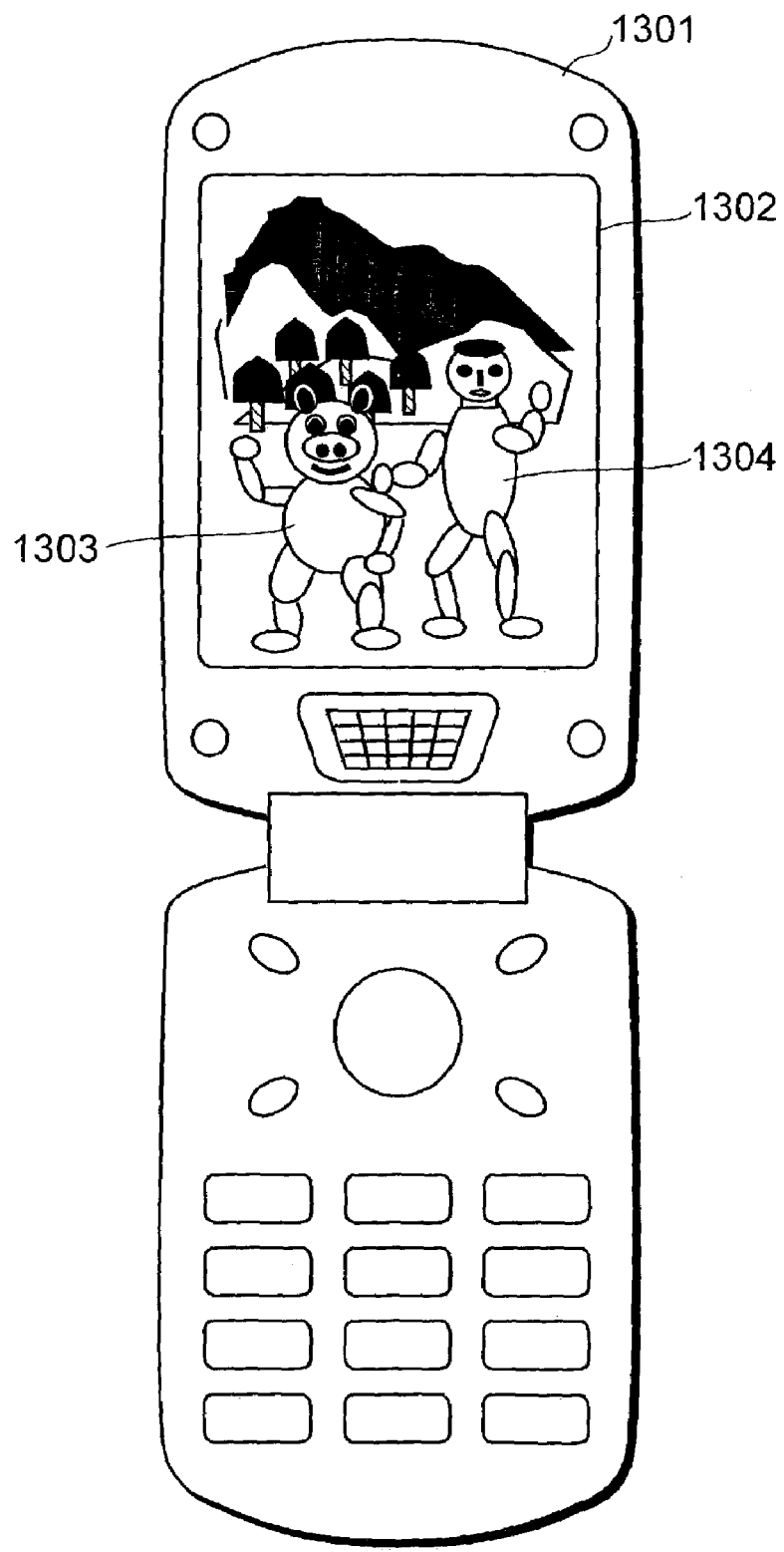
FIG. 13 shows a mobile phone that has the function of the CG animation apparatus of the present invention.

FIG. 13 shows a mobile phone 1301 that has the function of the CG animation apparatus of the present invention. The mobile phone 1301 includes a screen 1302, on which characters 1303 and 1304 are displayed. An animation control unit 1 assigns motion data and the like in accordance with element groups defined for each of the characters 1303 and 1304. A character state calculating unit 3 calculates shape data in accordance with changes in each element group of the characters 1303 and 1304, thereby controlling motion of the entire CG characters 1303 and 1304. Accordingly, motions of the characters 1303 and 1304 are independently controlled and displayed on the screen 1302. When a plurality of CG characters are displayed in this way, it is possible for the different CG characters to share motion data.

Although the present invention has been described based on the above embodiments, it should be clear that the present invention is not limited to these embodiments and may be achieved as other possible embodiments.

With the above construction, the present invention uses a new concept, that is, an element group defined independently of the skeletal structure. As a result, a variety of CG character motions can be produced using motion data according to the element group table, with variations of the motions determined in accordance with the number of combinations of element groups. In addition, as the element group table for use can be changed, not only variations in motions can be further increased, but also addition and deletion can be made for the CG character's shape and its hierarchical structure.

Moreover, the CG animation apparatus of the present invention handles a plurality of shape elements of the CG character as an element group, and each element group is given data so as to control motion of the entire CG character. Accordingly, it is no longer necessary to provide data to every shape element, and it becomes possible to change motion of the entire CG character using small amount of data.

The present invention is thus capable of minimizing data redundancy, which is a leading cause of the conventional problems, while producing a variety of CG character animation using smaller amount of data than required by the conventional technique. The present invention therefore solves the conventional problems. Also with the present invention, changes in CG character's shapes and addition and deletion to and from its hierarchical structure can be easily performed. The present invention is therefore capable of easily creating CG animation, such as motion of a CG character holding an object in its hand, which is difficult to create with the conventional technique. As has been described, it is clear that the present invention is highly effective and useful in the field of CG animation technology.

What is claimed is:

1. A computer graphics (CG) animation apparatus for displaying a character image, the computer graphics animation apparatus comprising:

a structure storing unit operable to store structure data showing a hierarchical structure for a plurality of character elements that make up the character image;

a table storing unit operable to store a group table showing a plurality of groups that each include some of the character elements;

a motion data storing unit operable to store motion data representing motions, each of which is associated with one of the plurality of groups;

an animation control unit operable to specify the motion data, the group table, and the structure data; and a state calculating unit operable to calculate shape data representing change in the character image over time in accordance with the motion data, the group table, and the structure data specified by the animation control unit, wherein for each of the plurality of groups, the motion data storing unit stores a plurality of sets of motion data representing a plurality of motions associated with a group, one of the motions being a basic motion, and the animation control unit also compulsorily specifies, for each of the plurality of groups, a set of motion data representing a basic motion, and then replaces the specified group table with another group table after synchronizing the plurality of groups.

2. A computer graphics (CG) animation apparatus for displaying a character image, the computer graphics animation apparatus comprising:

a structure storing unit operable to store structure data showing a hierarchical structure for a plurality of character elements that make up the character image;

a table storing unit operable to store a group table showing a plurality of groups that each include some of the character elements;

a motion data storing unit operable to store motion data representing motions, each of which is associated with one of the plurality of groups;

an animation control unit operable to specify the motion data, the group table, and the structure data; and a state calculating unit operable to calculate shape data representing change in the character image over time in accordance with the motion data, the group table, and the structure data specified by the animation control unit, wherein for each of the plurality of groups, the motion data storing unit stores a plurality of sets of motion data representing a plurality of motions associated with a group, one of the motions being a basic motion, and the animation control unit also compulsorily specifies, for each of the plurality of groups, a set of motion data representing a basic motion, and then replaces the specified group table with another group table.

* * * * *